(12) United States Patent
Chiang et al.

(10) Patent No.: US 9,779,321 B2
(45) Date of Patent: Oct. 3, 2017

(54) IMAGE PROCESSING DEVICE AND METHOD THEREOF

(71) Applicant: REALTEK SEMICONDUCTOR CORPORATION, Hsinchu (TW)

(72) Inventors: Hao-Tien Chiang, Taipei (TW); Shih-Tse Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/972,021

(22) Filed: Dec. 16, 2015

(65) Prior Publication Data

US 2016/0300326 A1  Oct. 13, 2016

(30) Foreign Application Priority Data

Apr. 10, 2015 (TW) .............................. 104111583 A

(51) Int. Cl.
*G06K 9/46* (2006.01)
*G06T 5/00* (2006.01)

(52) U.S. Cl.
CPC ............ *G06K 9/4604* (2013.01); *G06T 5/001* (2013.01); *G06T 2207/20012* (2013.01); *G06T 2207/20192* (2013.01)

(58) Field of Classification Search
CPC .. G06T 5/00; G06T 7/60; G06T 5/004; G06T 2207/20204; G06K 9/4604; G06K 9/40
USPC ........................................................ 382/199
See application file for complete search history.

(56) References Cited

U.S. PATENT DOCUMENTS

| | | | |
|---|---|---|---|
| 6,373,992 B1 * | 4/2002 | Nagao ...................... | G06K 9/40 358/447 |
| 7,010,174 B2 | 3/2006 | Kang et al. | |
| 7,659,930 B2 | 2/2010 | Wu | |
| 7,821,579 B2 | 10/2010 | Lin et al. | |
| 8,139,890 B2 | 3/2012 | Huang | |
| 2016/0275678 A1 * | 9/2016 | Onal ..................... | G06T 7/0012 |

FOREIGN PATENT DOCUMENTS

TW  200704207  1/2007

OTHER PUBLICATIONS

Taiwan Office Action for corresponding Taiwan No. 104111583 dated Jan. 25, 2016.

(Continued)

*Primary Examiner* — Ruiping Li
(74) *Attorney, Agent, or Firm* — WPAT, P.C., Intellectual Property Attorneys; Anthony King

(57) ABSTRACT

This invention discloses an image processing device and an image processing method. The image processing device includes a line buffer, a pixel enhancing module, a smoothing module, a noise reduction module and a contrast adjusting module. The line buffer stores a plurality of pixel values of an image. The pixel enhancing module performs an edge-enhancing operation on the image. The smoothing module filters the image to improve the image in terms of roughness. The noise reduction module filters the image to improve the image in terms of a signal-to-noise ratio. The contrast adjusting module checks whether a target pixel is on a thin edge to decide the method of adjusting the contrast of the image.

13 Claims, 7 Drawing Sheets

(56) References Cited

OTHER PUBLICATIONS

Search report for corresponding Taiwan No. 104111583 dated Jan. 25, 2016.
English abstract translation of the Taiwan Office Action for corresponding Taiwan No. 104111583 dated Jan. 25, 2016.
U.S. Pat. No. 7,821,579B2 is the US counterpart of TW200704207 (previously submitted on Feb. 17, 2016).

* cited by examiner

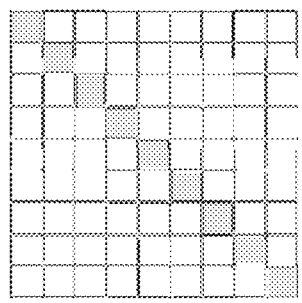
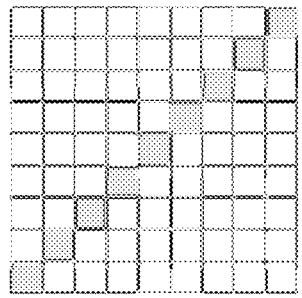
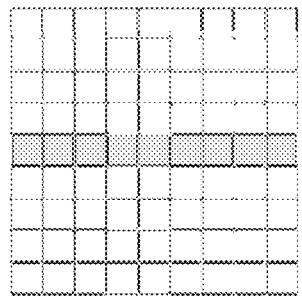
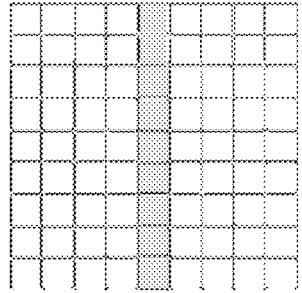
Fig. 2

IMAGE PROCESSING DEVICE AND METHOD THEREOF

BACKGROUND OF THE INVENTION

1. Field of the Invention

The present invention relates to an image processing device and the associated method, especially to an image processing device and its associated method that enhance the edges and details of an image.

2. Description of Related Art

Image enhancement is one of the most common and important techniques of image processing and can be basically divided into two categories: (A) enhancing brightness and colors of an image, and (B) enhancing textures of an image, such as edges and details. Image enhancement can be conducted based on both of the two categories or based solely on one of them. Nowadays there are a number of image evaluation standards that evaluate images based on the details and smooth areas of the images. For example, a test standard established by Microsoft, Inc. has defined several indexes such as Modulation Transfer Function (MTF), over-sharpness, roughness, acutance and signal-to-noise ratio (SNR). To pass these professional test standards, higher criteria of image quality are required and thus the corresponding image processing algorithms should be more robust. The algorithms for the (B) category of image enhancement plays a very important role in the abovementioned test standards.

SUMMARY OF THE INVENTION

In view of the problems of the prior art, an object of the present invention is to provide an image processing device and method to increase image adjusting flexibilities and to enhance image edges and details, so as to make an improvement to the prior art.

The present invention discloses an image processing device for processing am image comprising a plurality of pixels, each of which has a pixel value. The image processing device comprises a memory for storing a part of the pixel values; a pixel enhancing module, coupled to the memory, for performing an edge enhancement operation on the pixel values to generate a result; a first filtering module, coupled to the memory, for performing a first filtering process on the pixel values according to a first filter coefficient to generate a first filtered result; a second filtering module, coupled to the pixel enhancing module and the first filtering module, for performing a second filtering process according to a second filter coefficient, the result and the first filtered result and outputting a first intermediate value; and a contrast adjusting module, coupled to the second filtering module, for adjusting a contrast of the image according to a contrast adjusting parameter to generate a contrast adjusted result and generating an output value according to the first intermediate value and the contrast adjusted result. The first filter coefficient, the second filter coefficient and the contrast adjusting parameter can be adjusted independently.

The present invention also discloses an image processing method for processing an image comprising a plurality of pixels, each of which has a pixel value. The image processing method comprises the steps of: storing the pixel values; performing an edge enhancement operation on the pixel values to generate a result; performing a first filtering process on the pixel values according to a first filter coefficient to generate a first filtered result; adding the result and the first filtered result to generate a first intermediate value; performing a second filtering process on the first intermediate value according to a second filter coefficient to generate a second filtered result; generating a second intermediate value which is relevant to the second filtered result; adjusting a contrast of the image according to a contrast adjusting parameter to generate a contrast adjusted result; and generating an output value according to the second intermediate value and the contrast adjusted result. The first filter coefficient, the second filter coefficient and the contrast adjusting parameter can be adjusted independently.

The image processing device and method of this invention adjust coefficients or parameters of various kinds of image processing mechanisms independently and flexibly so that the adjusted images can meet plural image evaluation standards.

These and other objectives of the present invention no doubt becomes obvious to those of ordinary skill in the art after reading the following detailed description of the preferred embodiments that are illustrated in the various figures and drawings.

BRIEF DESCRIPTION OF THE DRAWINGS

FIG. 2 illustrates types of edge directions according to an embodiment of this invention.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

Figure 1:
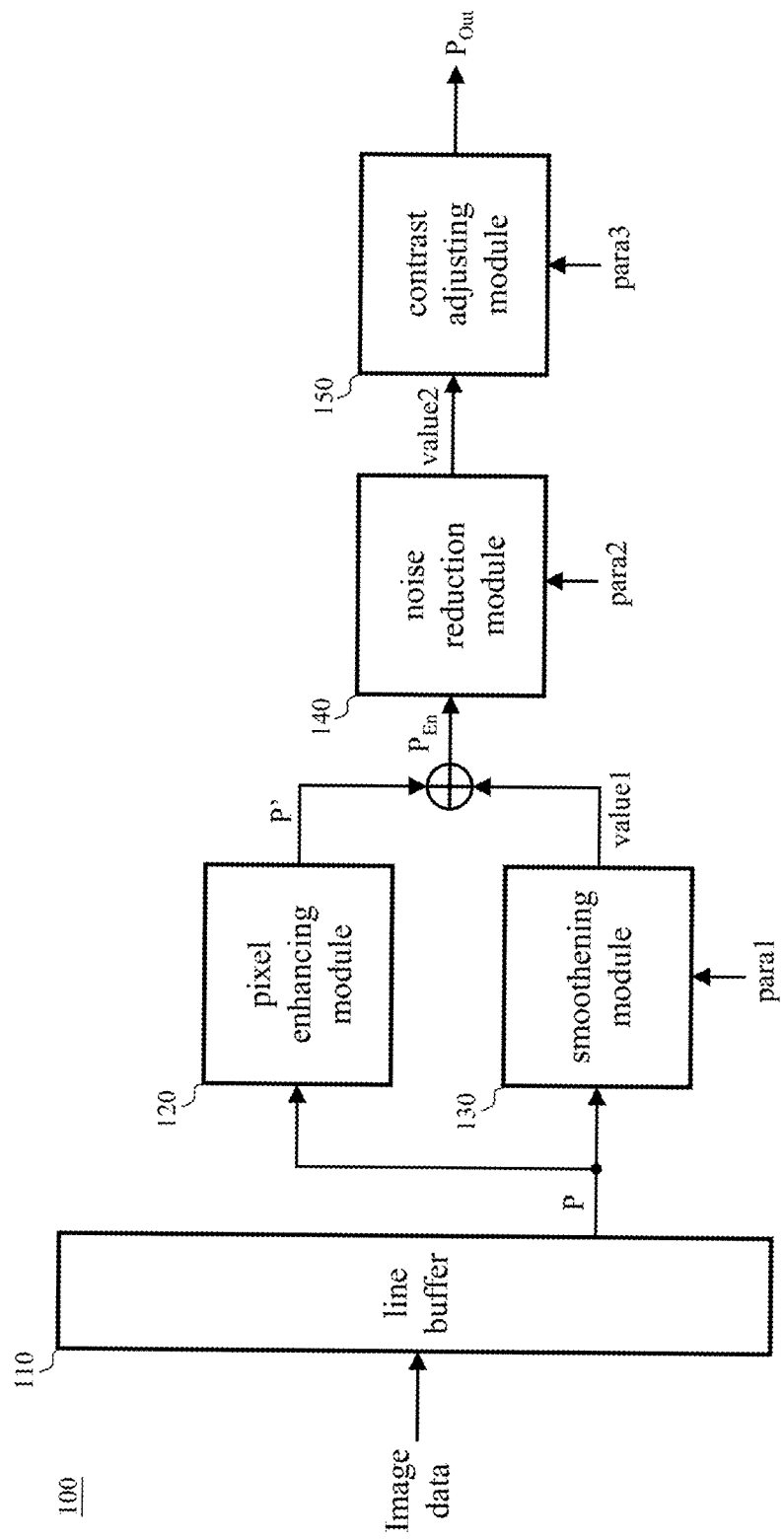
FIG. 1 illustrates a functional block diagram of an image processing device according to an embodiment of this invention.

FIG. 1 shows a functional block diagram of an image processing device according to an embodiment of this invention. The image processing device 100 includes a line buffer 110, a pixel enhancing module 120, a smoothening module 130, a noise reduction module 140 and a contrast adjusting module 150. When the image processing device 100 performs image processes on the image data, a target pixel in an image is usually taken as a reference and data of pixels neighboring the target pixel are temporarily stored in the line buffer 110 for the use of subsequent modules. For example, assuming that the image processing device 100 deals with a window of M*N pixels in each image process (N pixels being taken from each of M pixel lines, M and N being positive integer and can be equal or unequal), the window contains the target pixel and the line buffer 110 is designed to store at least M−1 pixel lines. Then the pixel enhancing module 120 and the smoothening module 130 respectively retrieve image data of the window from the line buffer 110 for processing. The line buffer 110 can be implemented by a DRAM (Dynamic Random Access Memory), an SDRAM (Synchronous Dynamic Random Access Memory) or an SRAM (Static Random Access Memory) and can be exclusively used by the image processing device 100 or shared with other circuits. The image processing device 100 is applicable to various kinds of image encoding methods, such as the Bayer domain, the RGB domain or the YUV domain. For the Bayer domain and the RGB domain, the data processed by the image processing device 100 can a pixel value that represents R, G or B; for the YUV domain, the data processed by the image processing device 100 can a pixel value that represents Y.

The pixel enhancing module 120 processes an original pixel value P based on an edge enhancement algorithm and an enhanced pixel value P' can be generated for each target pixel (or window). The pixel enhancing module 120 can utilize conventional algorithms such as an unsharp mask algorithm, a Laplacian matrix algorithm or other algorithms that obtain similar effects.

The smoothening module 130 acts to suppress jaggies at image edges. First, the smoothening module 130 identifies the location and direction of an edge in the window. The types of edge directions can be defined in advance; for example, FIG. 2 illustrates 4 types of edge directions (4 large rectangles being the windows and the grey dots being the pixels on the edge), but different types of edges may be defined in different embodiments. A first-order gradient filtering method, such as a well-known Sobel method, can be used to detect edges and identify their respective directions of an image. After the edges and their respective directions are found, a one-dimensional filtering process is performed on the pixels on the edges or pixels on normal vectors of the edges. For example, the window size shown in FIG. 2 is 9*9 pixels and the horizontal edge at the leftmost window includes 9 pixels, and the smoothening module 130 conducts the filtering process according to the following equation:

$$\text{value1} = \sum_{i=0}^{8} C_i \times P_i \quad (1)$$

where Pi are the original pixel values of the pixels on the edge and Ci are filter coefficients of corresponding pixels on the edge. In one embodiment, the filtered result value1 is an average of the pixel values of all the pixels on the edge (i.e., for all i, Ci=1/9); in other embodiments, the filter coefficients Ci can be set according to Gaussian distribution. The smoothening module 130 can refer to the signal para1 to determine the filter coefficients Ci. In one embodiment, the smoothening module 130 has an embedded look-up table and retrieves corresponding filter coefficients Ci from the look-up table according to the signal para1. For example, in one embodiment, the image processing device 100 may include other image processing modules (not shown) that generates the signal para1 by detecting image features, such as brightness, chroma and/or a degree of change in pixels, meaning that the filter coefficients Ci can be automatically adjusted according to image features; in another embodiment, the signal para1 is manually adjusted by a user depending on whether the filtered result value1 meets the practical requirements. Alternatively, the smoothening module 130 may not have an embedded look-up table and the filter coefficients Ci are carried by the signal para1. The smoothening module 130 generates a filtered result value1 for each target pixel (or window). A pixel value $P_{En}$ is generated by adding the filtered result value1 and its corresponding enhanced pixel value P'.

Figure 3:
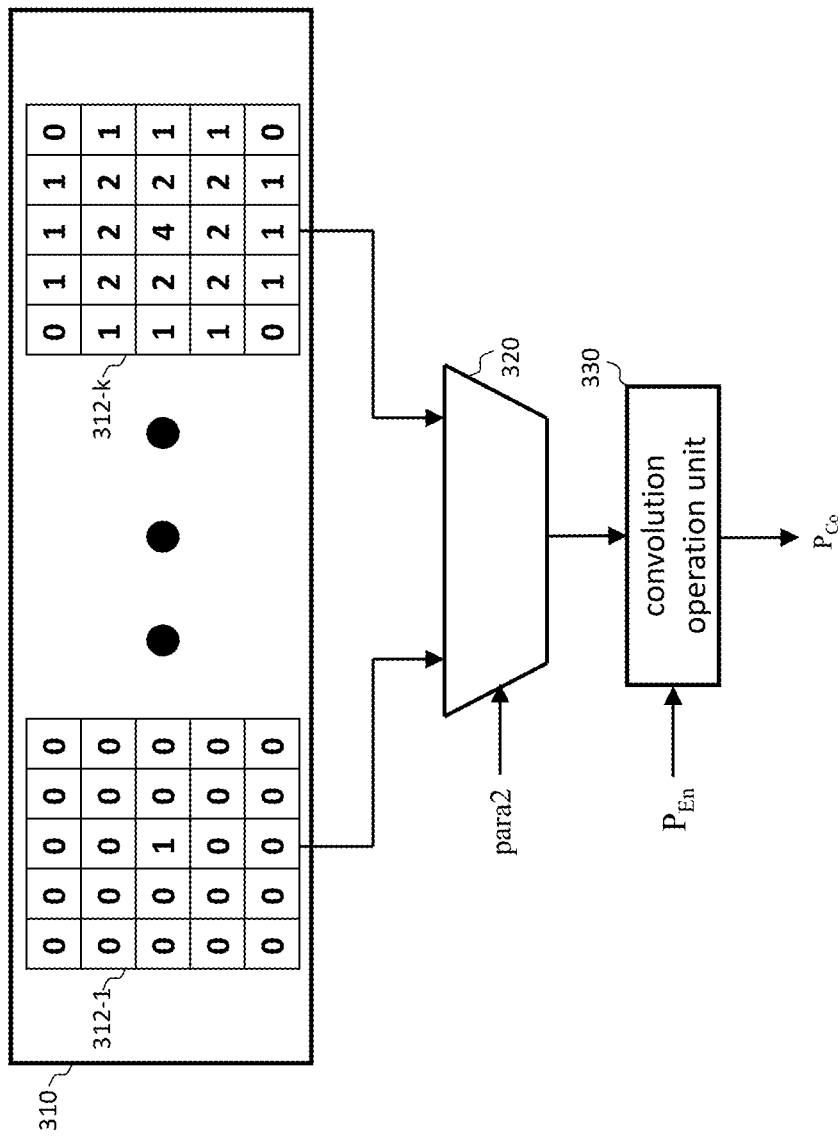
FIG. 3 illustrates a functional block diagram for performing a two-dimensional filtering process by the noise reduction module.

The noise reduction module 140 acts to suppress noises that grow as the images are being enhanced and to make smooth areas of an image even smoother to improve visual experiences of a user. In one embodiment, the noise reduction module 140 may include the functional blocks shown in FIG. 3 to perform a two-dimensional filtering process on the pixel value $P_{En}$. The storage unit 310 stores k sets of filter coefficients 312 (k being positive integer). In this embodiment, the window size is 5*5, and therefore each set of filter coefficients 312 includes 5*5=25 values. The values are not limited to the integers illustrated in the figure and can be rational numbers. The multiplexer 320 selects one of the k sets of filter coefficients 312 according to the signal para2 and then the convolution operation unit 330 performs a convolution operation on the pixel value $P_{En}$ according to the selected set of filter coefficients 312. Similarly, the k sets of filter coefficients 312 can be selected in response to the control of the signal para2, which can be adjusted automatically according to the image features or be manually adjusted by a user. In the convolution operation of the convolution operation unit 330, the 25 pixel values in the window are respectively multiplied by the values in corresponding positions of the selected set of filter coefficients, and then the 25 products are averaged.

As the details in an image are subject to the two-dimensional filtering process, the noise reduction module 140 determines the strength of the filtering process according to the amount of details in that image. To be specific, the noise reduction module 140 blends the filtered result $P_{Co}$ and the prior pixel value $P_{En}$ according to the following equation.

$$\text{value2} = \alpha \times P_{Co} + (1-\alpha) \times P_{En} \quad (2)$$

Figure 4:
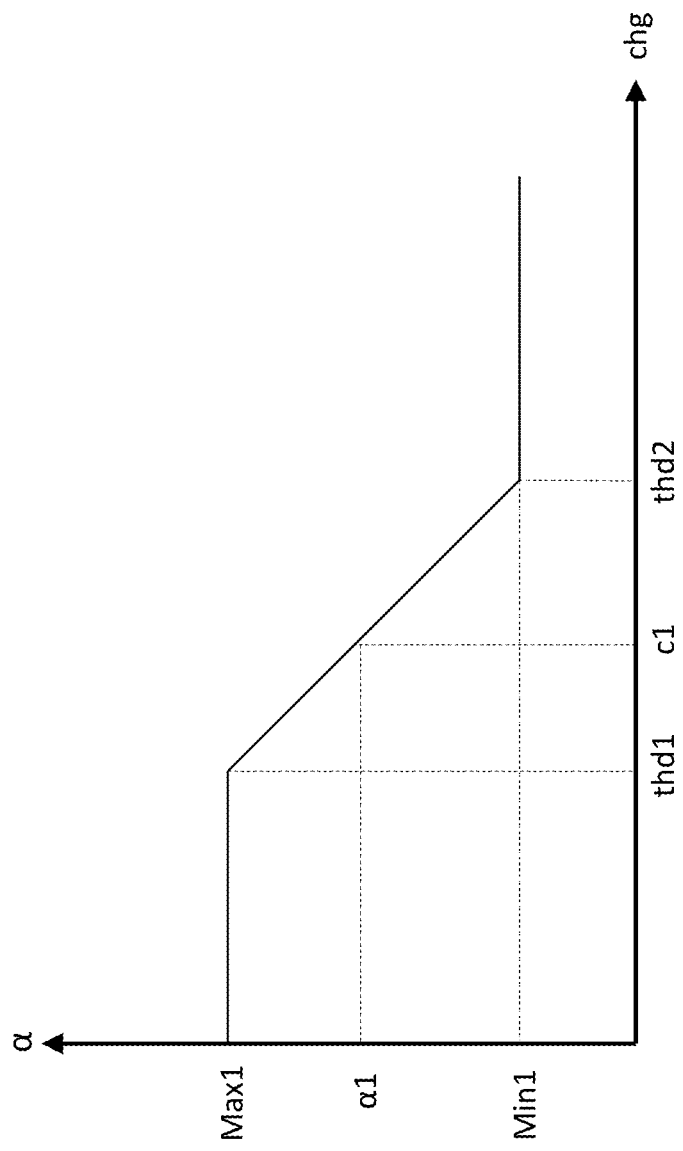
FIG. 4 illustrates a diagram for determining the weighting $\alpha$ based on the degree of change of an image according to an embodiment of this invention.

The weighting α is to control the percentage of the filtered result $P_{Co}$ and can be dynamically obtained according to the image features in the window. FIG. 4 shows a diagram for determining the weighting α based on the degree of change of an image according to an embodiment of this invention. The horizontal coordinate "chg", which stands for the degree of change of an image, can be obtained by a variety of methods, such as the well-known Sobel method. A larger chg means a higher degree of change and corresponds to a smaller weighting α in this embodiment; in other words, in order to avoid detail losses in an image caused by the two-dimensional filtering process, the calculated result value2 tends to keep more pixel value $P_{En}$ by reducing the percentage of the filtered result $P_{Co}$ of the two-dimensional filtering process when the image has more details (i.e., a higher degree of change). On the contrary, if an image is smooth (i.e., a low degree of change), the noise reduction module 140 tends to make the filtered result $P_{Co}$ of the two-dimensional filtering process take a larger portion in the calculated result value2. The values Max1 and Min1 in FIG. 4, which are flexible, represent the upper limit and the lower limit of the weighting α and correspond to the values thd1 and thd2 respectively. The values Max1 and Min1 have the following relationship: 0≤Min1<Max1≤1. The change rate of the weighting α with respect to the degree of change chg and the values thd1, thd2, Max1 and Min1 can be set in advance depending on the features of the images processed by the image processing device 100. The values thd1, thd2, Max1 and Min1 can be input to the noise reduction module 140 via the signal para2.

Figure 5:
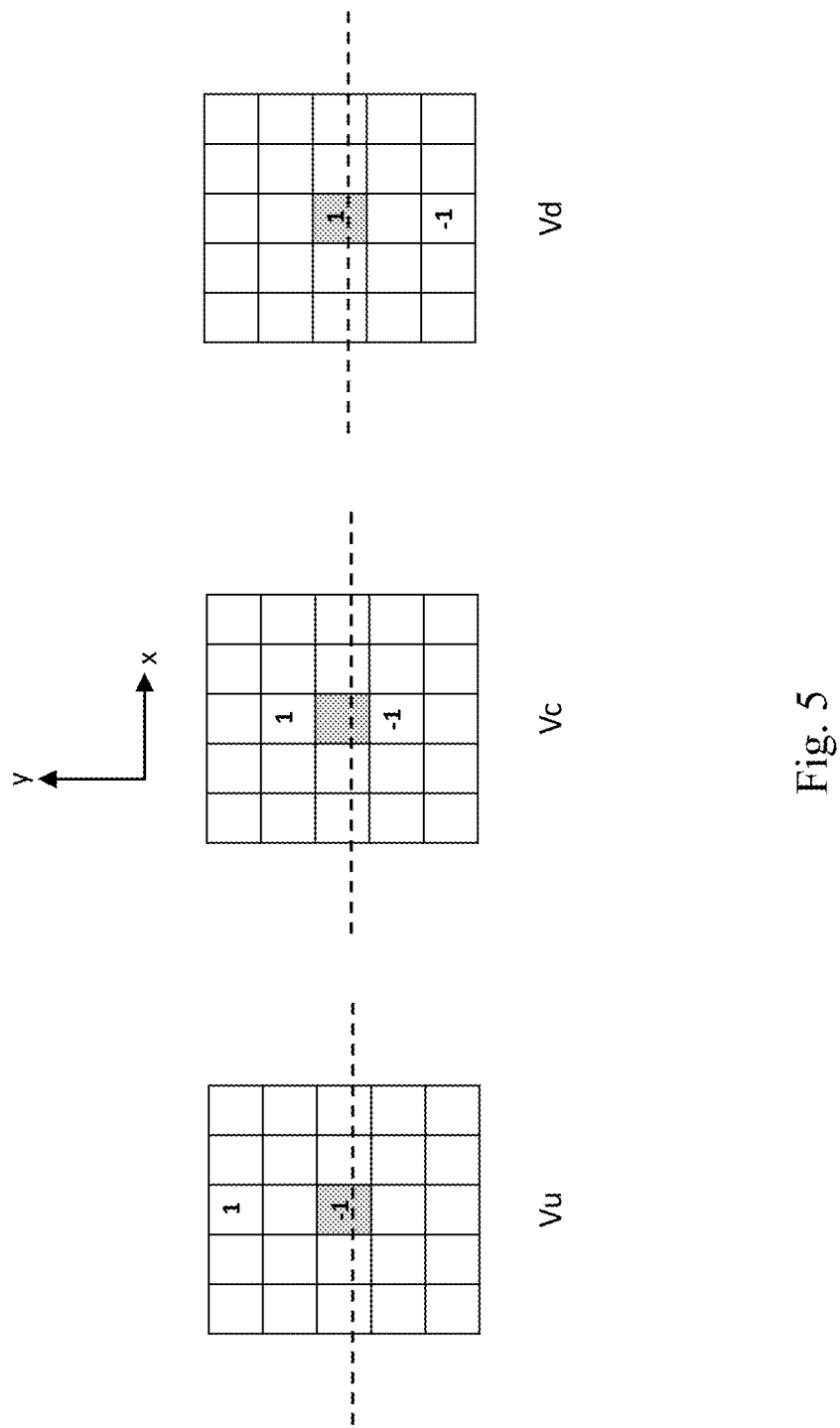
FIG. 5 illustrates a method of determining whether an edge is a thin edge according to an embodiment of this invention.

The calculated result value2 is then processed by the contrast adjusting module 150 which adjusts the contrast of an image to meet the MTF standard. Since the MTF standard is highly relevant to image edges, to be more specific, relevant to the details of an edge where the target pixel locates, the contrast adjusting module 150 determines whether the target pixel is on a thin edge before performing the operations. FIG. 5 illustrates a method of determining whether an edge is a thin edge according to an embodiment of this invention. A window size of 5*5 pixels is taken as an example in the figure and the grey dot represents the target pixel. In this illustrative example, the pixel in the center of a window is taken as the target pixel. The dotted lines in the figure represent the locations of the edges (along the x-axis). After the target pixel is determined to be on the edge, through the Sobel method, for example, the edge is further determined to be a thin edge or not. The 3 rectangles stand for 3 filter masks, and the numbers in each mask stand for the filter coefficients while blanks stand for number 0. In the determination process, each of the 3 filter masks is used to perform convolution operations on the calculated result value2 of a window, and the absolute values of the convolution results are calculated. The 3 masks are utilized for calculating the changes in pixel values of multiple pixels, which are located along a norm vector of the edge (i.e., the y-axis) and in line with the target pixel. Pixel differences Vu, Vc and Vd of the 3 masks, corresponding respectively to a location slightly above the edge, a location on the edge and a location slightly below the edge, are obtained. The pixels near an edge usually have gradients in pixel values along the norm vectors of the edge. The determination of thin edges is actually to determine whether the changes in pixel values of the pixels along the norm vectors of the edge are prominent or not. A prominent change in pixel values stands for a thin edge; therefore, if Vc is larger than Vu and Vd, the target pixel is determined to be on a thin edge.

If the contrast adjusting module 150 determines that the target pixel is not on a thin edge, it directly outputs the calculated result value2 of the noise reduction module 140. If, however, the target pixel is on a thin edge, the contrast adjusting module 150 improves the contrast of an image according to the following equation.

$$P_{To} = (value2 - 2^{n-1}) \times R + 2^{n-1} \quad (3)$$

R is the contrast adjusting ratio, which can be automatically adjusted according to the features of an image or manually adjusted according to the image evaluation standards, and n is the number of bits of a pixel. $P_{To}$ is the pixel value after the contrast adjustment. In addition to equation (3), there are further a number of methods for improving pixel contrast, which can also be applied to this invention. After the new pixel value $P_{To}$ is obtained, the contrast adjusting module 150 blends the pixel value $P_{To}$ with the calculated result value2 to generate a calculated result value3 by the following equation:

$$value3 = \beta \times P_{To} + (1-\beta) \times value2 \quad (4)$$

Figure 6:
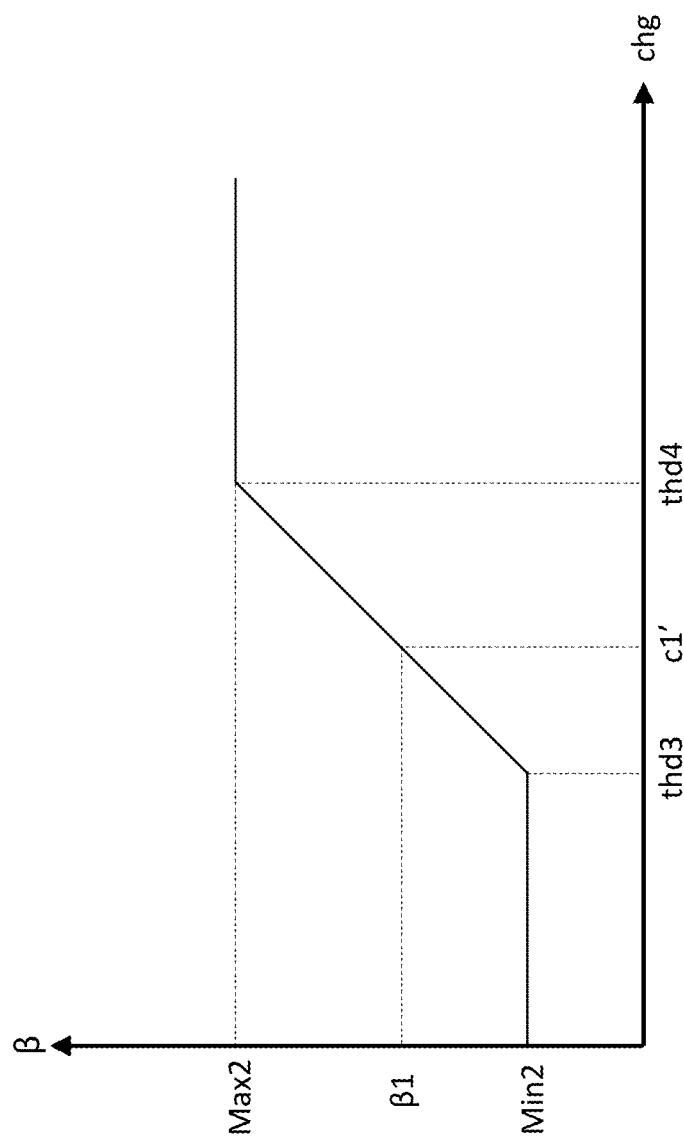
FIG. 6 illustrates a diagram for determining the weighting $\beta$ based on the degree of change of an image according to an embodiment of this invention.

The weighting β is to control the percentage of the pixel value $P_{To}$ and can be dynamically determined according to the features of an image. FIG. 6 shows a diagram for determining the weighting β based on the degree of change of an image according to an embodiment of this invention. The horizontal axis "chg" stands for the degree of change of an image. In this embodiment, the weighting β increases as the value of "chg" becomes larger; i.e., when an image has more details, the contrast of the image is improved accordingly to make the rim of a thin edge become sharper. On the contrary, when an image has a low degree of change, which implies a relatively sharp thin edge, the percentage of the pixel value $P_{To}$ is reduced accordingly. Similarly, the values Max2 and Min2 in FIG. 6, which are flexible, represent the upper limit and the lower limit of the weighting β and correspond to the values thd4 and thd3 respectively. The values Max2 and Min2 have the following relationship: 0≤Min2<Max2≤1. The change rate of the weighting β with respect to the degree of change chg and the values thd3, thd4, Max2 and Min2 can be set in advance depending on the features of the images processed by the image processing device 100. The values R, thd3, thd4, Max2 and Min2 can be input to the contrast adjusting module 150 via the signal para3.

After the above modules perform their respective functions, the image processing device 100 generates an output pixel value $P_{Out}$. Each module can be adaptively adjusted to meet different image evaluation standards; for example, the smoothening module 130 is able to make the output pixel value $P_{Out}$ better comply with the image evaluation standard of roughness by changing its filter coefficients; the noise reduction module 140 is able to make the output pixel value $P_{Out}$ better comply with the image evaluation standard of SNR by selecting different filter masks; and the contrast adjusting module 150 is able to make the output pixel value $P_{Out}$ better comply with the image evaluation standard of MTF by checking whether or not the target pixel is on a thin edge and by adjusting the contrast. The parameters or coefficients used in each module can be adjusted individually, which enables this invention to independently adjust image characteristics to comply with various kinds of image evaluation standards and thereby to adjust images quickly to satisfy all kinds of applications or image evaluation standards. The noise reduction module 140 and the contrast adjusting module 150 can further adjust the acutance of the output pixel value $P_{Out}$ by taking the degree of change chg into consideration. Moreover, for flexible and convenient adjustments, the smoothening module 130 can selectively process the thin edges only.

Figure 7:
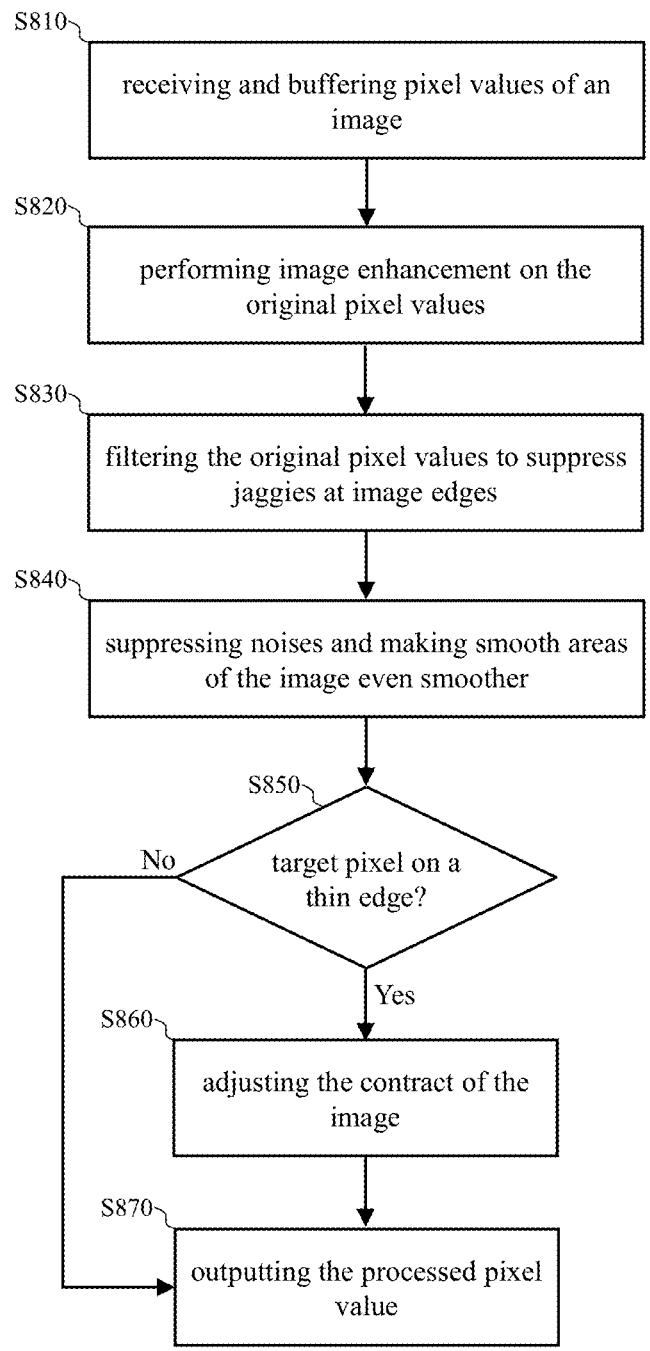
FIG. 7 illustrates a flowchart of an image processing method according to an embodiment of this invention.

FIG. 7 illustrates a flowchart of an image processing method according to an embodiment of this invention. The method includes the steps of:

Step S810: receiving and buffering pixel values of an image. The pixel values include a pixel value of a target pixel. When buffering the pixel values, only a part of the pixel values of some pixel lines of the image are needed to be stored;

Step S820: performing image enhancement on the original pixel values. This step enhances the image edges of the original pixel values P and obtains processed pixel values P' using an unsharp mask algorithm, a Laplacian matrix algorithm or other algorithms having the same or similar purposes;

Step S830: filtering the original pixel values to suppress jaggies at image edges. In this step, directions of the edges are identified before a one-dimensional filtering process is performed on pixels on the edge or pixels on a norm vector of the edge. The filter coefficients can be either automatically determined by detecting the features of the image, or manually adjusted by a user according to the filtered results, or both. A filtered result value1 is obtained after this step is finished;

Step S840: suppressing noises and making smooth areas of the image even smoother. This step performs a two-dimensional filtering process on a pixel values $P_{En}$, which is a sum of the pixel value P' generated in the step S820 and the filtered result value1 generated in the step S830 to suppress the increased noise resulting from the image enhancing process. This step selects one set of filter coefficients from multiple sets and performs a convolution operation according to the selected set of filter coefficients and the pixel value $P_{En}$ to obtain a filtered result $P_{Co}$. In addition, this step further blends the filtered result $P_{Co}$ with the pixel value $P_{En}$ according to the degree of change of the image to obtain a calculated result value2. Similarly, the filter coefficients can be either automatically determined by detecting the features of the image, or manually adjusted by a user according to the filtered results, or both;

Step S850: detecting whether the target pixel is on a thin edge. In this step, whether the target pixel is on an edge is determined (for example, using the method in the step S830) and, if affirmative, whether the edge is a thin edge is further determined. To determine whether an edge is a thin edge, the filter masks shown in FIG. 5 can be used to perform a convolutional operation on the calculated result value2 generated in the step S840. If the edge is a thin edge, then the following step S860 is executed; on the contrary, if the target pixel is not on an edge or if the target pixel is on a regular edge rather than a thin edge, the step S870 is executed;

Step S860: adjusting the contract of the image. Because the MTF standard is highly relevant to the sharpness of the edge, improvements in the contrast of thin edges are advantageous in meeting the MTF standard. There are a variety of ways in improving the contrast and this invention is not limited to the method of equation (3). After the contrast is adjusted, the pixel value $P_{To}$ is obtained. In addition, this step further blends the pixel value $P_{To}$ with the calculated result value2 to obtain a calculated result value3 according to the degree of change of the image; and Step S870: outputting the processed pixel value. If the determination of the step S850 is negative, this step outputs the calculated result value2 as the final output pixel value $P_{Out}$; if, however, the determination of the step S850 is affirmative, this step outputs the blended result value3 obtained in the step S860 as the final output pixel value $P_{Out}$.

To increase adjustment flexibilities, a thin edge detecting process can be alternatively performed before the step S830. To be more specific, after the step S820, whether the target pixel is on a thin edge is detected. If the detection result is affirmative, the step S830 is executed; if not, the step S840 is executed by neglecting the step S830. Further, this invention can selectively perform relevant steps according to different image processing requirements; i.e., not all the steps S830, S840 and S860 must be performed. For example, if the image evaluation standard of SNR is relatively trivial in a certain image processing, the step S840 can be neglected.

The pixel enhancing module 120, the smoothening module 130, the noise reduction module 140 and the contrast adjusting module 150 can be implemented by hardware, software, and/or firmware. When these modules are implemented by software or firmware, the image processing device 100 may utilize a processor, a controller, an MCU (micro control unit) and the like to execute program codes or instructions stored in a memory to perform the functions of each module. Please note that there is no step sequence limitation for the method inventions as long as the execution of each step is applicable. Furthermore, the shape, size, and ratio of any element and the step sequence of any flow chart in the disclosed figures are just exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An image processing device for processing an image comprising a plurality of pixels, each pixel having a pixel value, the image processing device comprising:
a memory for storing a part of the pixel values;
a pixel enhancing circuit, coupled to the memory, for performing an edge enhancement operation on the pixel values to generate a result;
a first filtering circuit, coupled to the memory, for performing a first filtering process on the pixel values according to a first filter coefficient to generate a first filtered result;
a second filtering circuit, coupled to the pixel enhancing circuit and the first filtering circuit, for performing a second filtering process according to a second filter coefficient, the result and the first filtered result and outputting a first intermediate value; and
a contrast adjusting circuit, coupled to the second filtering circuit, for adjusting a contrast of the image according to a contrast adjusting parameter to generate a contrast adjusted result and generating an output value according to the first intermediate value and the contrast adjusted result;
wherein, the first filter coefficient, the second filter coefficient and the contrast adjusting parameter can be adjusted independently;
wherein the contrast adjusting circuit further determines whether the differences among a part of the first intermediate values meet an edge condition, wherein the part of the first intermediate values corresponds to pixels arranged along the same direction perpendicular to an edge direction of the image.

2. The image processing device of claim 1, wherein the second filtering circuit performs the second filtering process on a second intermediate value which is a sum of the result and the first filtered result to obtain a second filtered result and generates the first intermediate value according to the second intermediate value and the second filtered result.

3. The image processing device of claim 1, wherein the first filtering circuit further determines the edge direction of the image and performs the first filtering process on a plurality of pixels arranged along the edge direction or on a plurality of pixels arranged along a direction perpendicular to the edge direction.

4. The image processing device of claim 1, wherein the first filtering circuit further determines whether the differences among a part of the pixel values meet the edge condition to selectively perform the first filtering process, wherein the part of the pixel values corresponds to pixels arranged along the same direction perpendicular to the edge direction of the image.

5. An image processing method for processing an image comprising a plurality of pixels, each pixel having a pixel value, the image processing method comprising the steps of:
storing the pixel values;
performing an edge enhancement operation on the pixel values to generate a result;

performing a first filtering process on the pixel values according to a first filter coefficient to generate a first filtered result;

adding the result and the first filtered result to generate a first intermediate value;

performing a second filtering process on the first intermediate value according to a second filter coefficient to generate a second filtered result;

generating a second intermediate value which is relevant to the second filtered result;

adjusting a contrast of the image according to a contrast adjusting parameter to generate a contrast adjusted result; and generating an output value according to the second intermediate value and the contrast adjusted result;

wherein, the first filter coefficient, the second filter coefficient and the contrast adjusting parameter can be adjusted independently;

wherein the step of generating the second intermediate value performs a blending operation on the second filtered result and the first intermediate value to generate the second intermediate value.

6. The image processing method of claim 5, further comprising:

determining, before adjusting the contrast of the image, whether the differences among a part of the second intermediate values meet an edge condition, wherein the part of the second intermediate values corresponds to pixels arranged along the same direction perpendicular to an edge direction of the image.

7. The image processing method of claim 5, further comprising:

determining an edge direction of the image;

wherein, the step of performing the first filtering process on the pixel values according to the first filter coefficient performs the first filtering process on a plurality of pixels arranged along the edge direction or on a plurality of pixels arranged along a direction perpendicular to the edge direction.

8. The image processing method of claim 5, further comprising:

determining whether differences among a part of the pixel values meet an edge condition to decide whether to perform the first filtering process or not;

wherein the part of the pixel values corresponds to pixels arranged along the same direction perpendicular to an edge direction of the image.

9. An image processing device for processing an image comprising a plurality of pixels, each pixel having a pixel value, the image processing device comprising:

a memory for storing a part of the pixel values;

a pixel enhancing circuit, coupled to the memory, for performing an edge enhancement operation on the pixel values to generate a result;

a first filtering circuit, coupled to the memory, for performing a first filtering process on the pixel values according to a first filter coefficient to generate a first filtered result;

a second filtering circuit, coupled to the pixel enhancing circuit and the first filtering circuit, for performing a second filtering process according to a second filter coefficient on a first intermediate value that is a sum of the result and the first filtered result to obtain a second filtered result, and outputting a second intermediate value based on at least the second filtered result; and a contrast adjusting circuit, coupled to the second filtering circuit, for adjusting a contrast of the image according to a contrast adjusting parameter to generate a contrast adjusted result and generating an output value according to the second intermediate value and the contrast adjusted result;

wherein, the first filter coefficient, the second filter coefficient and the contrast adjusting parameter can be adjusted independently.

10. The image processing device of claim 9, wherein the contrast adjusting circuit further determines whether the differences among a part of the second intermediate values meet an edge condition, wherein the part of the second intermediate values corresponds to pixels arranged along the same direction perpendicular to an edge direction of the image.

11. The image processing device of claim 9, wherein the second filtering circuit generates the second intermediate value according to the first intermediate value and the second filtered result.

12. The image processing device of claim 9, wherein the first filtering circuit further determines an edge direction of the image and performs the first filtering process on a plurality of pixels arranged along the edge direction or on a plurality of pixels arranged along a direction perpendicular to the edge direction.

13. The image processing device of claim 9, wherein the first filtering circuit further determines whether the differences among a part of the pixel values meet an edge condition to selectively perform the first filtering process, wherein the part of the pixel values corresponds to pixels arranged along the same direction perpendicular to an edge direction of the image.

\* \* \* \* \*